United States Patent Office.

GEORG EICHELBAUM, OF BERLIN, GERMANY.

MANUFACTURE OF FOOD FROM YEAST.

SPECIFICATION forming part of Letters Patent No. 660,008, dated October 16, 1900.

Application filed January 19, 1900. Serial No. 2,032. (No specimens.)

*To all whom it may concern:*

Be it known that I, GEORG EICHELBAUM, chemist, a subject of the King of Prussia, Emperor of Germany, residing at 62 Kantstrasse, Berlin, in the German Empire, have invented certain new and useful Improvements in the Manufacture of Food from Yeast, of which the following is a specification.

It is known that meat extract owes its pleasant smell and taste mainly to certain extractive substances containing nitrogen, which are formed by the decomposition and conversion of albuminous substances. It would thus be important from a technical point of view to effect this decomposition and conversion artificially with suitable material by suitable means. A convenient means for carrying out this decomposition of albumen artificially is provided by the action of certain kinds of aspergillus. In this action a decomposition of the albuminous substances takes place without any material loss of nitrogen in ammonia, amide, and xanthine compounds, and the non-albuminous nitrogen compounds contained in the substance rise to double their former amount. I have discovered that this action of certain kinds of aspergillus and their peptonizing and fermenting power is capable of an extended application. I have, moreover, discovered that yeast has shown itself to be an especially suitable subject for the action of the various kinds of aspergillus, since it is very rich in albumen and also forms a cheap raw material.

My process is as follows: Ordinary washed and pressed distillery or brewery yeast, for example, is taken and killed by heating. The more or less thick mass, or even the dried, ground, and again moistened powder, is then sown with the spores of a culture of aspergillus oryzeæ or wentii or allied fungus, and mixed. The mass is then subjected for at least eight to ten days, with occasional stirring, to a breeding temperature of about 32° to 38° centigrade. If desired, the action of the fungus can be promoted by adding to the mass suitable substances for promoting the existing conditions and the growth of the fungus. After about ten days there is added to the mass an amount of common salt equal to about five per cent. of the weight of the yeast employed, the mass is allowed to stand another two days, and then treated with hot water, extracted, filtered, pressed in a suitable manner, and evaporated to the consistency of a syrup. The product obtained, which may amount to twenty per cent. of the yeast employed, can scarcely be distinguished in appearance, smell, taste, and composition from ordinary meat extract.

What I claim is—

1. The process for the manufacture from yeast of a food similar to meat extract which consists in sowing and mixing with killed yeast the spores of a culture of aspergillus and then subjecting the mass to a breeding temperature, substantially as described.

2. The process for the manufacture from yeast of a food similar to meat extract, which consists in heating and thereby killing the yeast, sowing and mixing therewith the spores of a culture of aspergillus, subjecting the mass to a breeding temperature of from 32° to 38° centigrade for a period of from eight to ten days, adding salt to the mass equivalent in weight to five per cent. of the weight of the yeast employed, allowing the mass to stand for about two days and finally extracting, filtering and evaporating the solution to the consistency of syrup, substantially as described.

3. The process for the manufacture from yeast of a food similar to meat extract which consists in sowing and mixing with killed yeast the spores of a culture of aspergillus oryzeæ, and afterward subjecting the mass to a breeding temperature, substantially as described.

In witness whereof I have hereunto set my hand in presence of two witnesses.

GEORG EICHELBAUM.

Witnesses:
HENRY HASPER,
WOLDEMAR HAUPT.